US009582526B2

(12) United States Patent
Battaglia et al.

(10) Patent No.: US 9,582,526 B2
(45) Date of Patent: Feb. 28, 2017

(54) OPTIMIZING DATABASE DEFINITIONS IN AN EXISTING DATABASE

(71) Applicant: International Business Machines Corporation, Armonk, NY (US)

(72) Inventors: Michael Battaglia, Lagrangeville, NY (US); Heather A. Smith, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 14/268,138

(22) Filed: May 2, 2014

(65) Prior Publication Data

US 2015/0317361 A1 Nov. 5, 2015

(51) Int. Cl.
*G06F 17/30* (2006.01)

(52) U.S. Cl.
CPC .. *G06F 17/30306* (2013.01); *G06F 17/30477* (2013.01); *G06F 17/30864* (2013.01)

(58) Field of Classification Search
CPC ......... G06F 17/30477; G06F 17/30306; G06F 7/308641
USPC ....................................................... 707/718
See application file for complete search history.

(56) References Cited

U.S. PATENT DOCUMENTS

| 7,580,941 | B2 * | 8/2009 | Narasayya ........ G06F 17/30306 |
| 8,271,457 | B2 | 9/2012 | Vos et al. |
| 2004/0215626 | A1 * | 10/2004 | Colossi ............. G06F 17/30312 |
| 2007/0011192 | A1 * | 1/2007 | Barton .............. G06F 17/30923 |
| 2008/0071730 | A1 | 3/2008 | Barcia et al. |
| 2011/0106812 | A1 | 5/2011 | Hammerschmidt et al. |
| 2015/0186447 | A1 * | 7/2015 | Milousheff ....... G06F 17/30584 707/694 |
| 2015/0262063 | A1 * | 9/2015 | Burger ................... G06N 5/025 706/46 |

FOREIGN PATENT DOCUMENTS

| EP | 0723239 A1 | 7/1996 |
| GB | 2253500 A | 9/1992 |

OTHER PUBLICATIONS

Battaglia, Michael et al., "System and Method for Optimizing Database Definitions for a New Database", filed Mar. 27, 2014, U.S. Appl. No. 14/227,780.
Disclosed Anonymously, "Method for Handling Long Running Sequences of Operations on Relational Database", IP.com, IPCOM000221306D, Sep. 12, 2012, 16 pages.
(Continued)

*Primary Examiner* — Hicham Skhoun
(74) *Attorney, Agent, or Firm* — Stephen R. Tkacs; Stephen J. Walder, Jr.; Kurt P. Goudy

(57) ABSTRACT

A mechanism is provided in a data processing system for optimizing a database definition of an existing database. The mechanism receives usage data for the existing database. The mechanism queries a knowledgebase for information about database objects of the existing database. The mechanism executes optimization logic to generate a set of database commands based on the usage data and information about database objects. The set of database commands, when executed against a database definition of the existing database, optimize one or more database objects of the existing database. The mechanism returns the set of optimization commands.

19 Claims, 3 Drawing Sheets

(56) References Cited

OTHER PUBLICATIONS

IBM, "Method for Managing Version of Database Schema", IP.com, IPCOM000227716D. May 13, 2013, 10 pages.
Miszczyk, Jarek et al., "DB2 UDB for AS/400 Object Relational Support", IBM Corporation, www.redbooks.ibm.com, Feb. 2000, 256 pages.
Wikipedia, "Data Definition Language", http://en.wikipedia.org/wiki/Data_definition_language, Mar. 4, 2014, 4 pages.
Wikipedia, "Data Definition Language (DDL)", http://whatis.techtarget.com/definition/Data-Definition-Language-DDL, Mar. 4, 2014, 1 page.
Wikipedia, "Database Index", http://en.wikipedia.org/wiki/Database_index, Apr. 30, 2014, 6 pages.
Wikipedia, "Table (database)", http://en.wikipedia.org/wiki/Table_(database), Mar. 4, 2014, 2 pages.
Wikipedia, "Tablespace", http://en.wikipedia.org/org/wiki/Tablespace, Mar. 4, 2014, 1 page.

\* cited by examiner

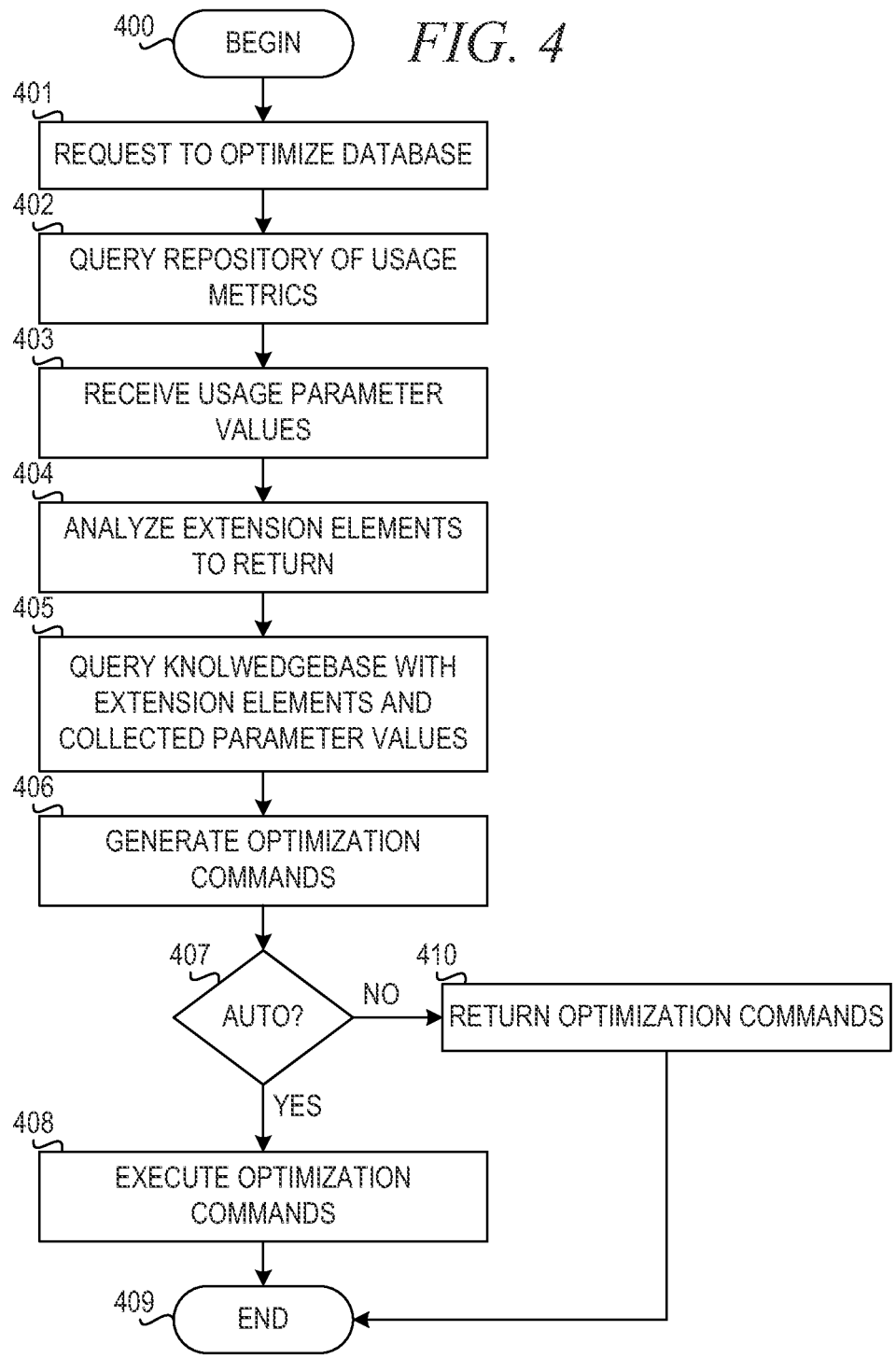

OPTIMIZING DATABASE DEFINITIONS IN AN EXISTING DATABASE

BACKGROUND

The present application relates generally to an improved data processing apparatus and method and more specifically to mechanisms for optimizing database definitions in an existing database.

The relational model for database management is a database model based on first-order predicate logic, first formulated and proposed in 1969 by Edgar F. Codd. In the relational model of a database, all data is represented in terms of tuples, grouped into relations. A database organized in terms of the relational model is a relational database. In the relational model, related records are linked together with a "key." The purpose of the relational model is to provide a declarative method for specifying data and queries: users directly state what information the database contains and what information they want from it, and let the database management system software take care of describing data structures for storing the data and retrieval procedures for answering queries.

Most relational databases use the Structured Query Language (SQL) data definition and query language; these systems implement what can be regarded as an engineering approximation to the relational model. A table in an SQL database schema corresponds to a predicate variable; the contents of a table to a relation; key constraints, other constraints, and SQL queries correspond to predicates. However, SQL databases deviate from the relational model in many details.

The relational model's central idea is to describe a database as a collection of predicates over a finite set of predicate variables, describing constraints on the possible values and combinations of values. The content of the database at any given time is a finite (logical) model of the database, i.e. a set of relations, one per predicate variable, such that all predicates are satisfied. A request for information from the database (a database query) is also a predicate.

Database normalization is the process of organizing the fields and tables of a relational database to minimize redundancy. Normalization usually involves dividing large tables into smaller (and less redundant) tables and defining relationships between them. The objective is to isolate data so that additions, deletions, and modifications of a field can be made in just one table and then propagated through the rest of the database using the defined relationships. A standard piece of database design guidance is that the designer should first create a fully normalized design; then selective denormalization can be performed for performance reasons A data definition language or data description language (DDL) is a syntax similar to a computer programming language for defining data structures, especially database schemas. DDL defines each data element as if it appears in the database before the element is translated into the forms required by application program.

Many data description languages use a declarative syntax to define fields and data types. Structured Query Language (SQL), however, uses a collection of imperative verbs whose effect is to modify the schema of the database by adding, changing, or deleting definitions of tables or other objects. These statements can be freely mixed with other SQL statements, so the DDL is not truly a separate language. A CREATE statement makes a new database, table, index, or stored procedure. A CREATE statement in SQL creates an object in a relational database management system (RDBMS). A DROP statement in SQL removes an object from a relational database management system (RDBMS). An ALTER statement in SQL changes the properties of an object inside of a relational database management system (RDBMS). The types of objects that can be altered depends on which RDBMS is being used.

Other models are the hierarchical model and network model. Some systems using these older architectures are still in use today in data centers with high data volume needs, or where existing systems are so complex and abstract it would be cost-prohibitive to migrate to systems employing the relational model; also of note are newer object-oriented databases.

A hierarchical database model is a data model in which the data is organized into a tree-like structure. The structure allows representing information using parent/child relationships: each parent can have many children, but each child has only one parent (also known as a 1-to-many relationship). All attributes of a specific record are listed under an entity type. The network model is a database model conceived as a flexible way of representing objects and their relationships. Its distinguishing feature is that the schema, viewed as a graph in which object types are nodes and relationship types are arcs, is not restricted to being a hierarchy or lattice.

A NoSQL database provides a mechanism for storage and retrieval of data that is modeled in means other than the tabular relations used in relational databases. Motivations for this approach include simplicity of design, horizontal scaling and ease of development. The data structure (e.g., tree, graph, key-value) differs from the RDBMS, and therefore some operations are faster in NoSQL and some in RDBMS. There are differences though and the particular suitability of a given NoSQL DB depends on the problem to be solved. The appearance of mature NoSQL databases has reduced the rationale for Java content repository (JCR) implementations. NoSQL databases are finding significant and growing industry use in big data and real-time web applications. NoSQL systems are also referred to as "Not only SQL" to emphasize that they may in fact allow SQL-like query languages to be used.

SUMMARY

In one illustrative embodiment, a method, in a data processing system, is provided for optimizing a database definition of an existing database. The method comprises receiving usage data for the existing database. The method further comprises querying a knowledgebase for information about database objects of the existing database. The method further comprises executing optimization logic to generate a set of database commands based on the usage data and information about database objects. The set of database commands, when executed against a database definition of the existing database, optimize one or more database objects of the existing database. The method further comprises returning the set of optimization commands.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating the operation of a mechanism for optimizing database definitions in an existing database in accordance with an illustrative embodiment.

DETAILED DESCRIPTION

The illustrative embodiments provide a mechanism for optimizing database definitions in an existing database. In particular, creating a relational database is a complicated process. To get an optimal definition requires a significant amount of understanding of the database you are using as well as the data that will populate it. A database administrator (DBA) spends years becoming an expert in his or her field to eventually understand and follow all of the nuances that deliver the best performance.

Beyond the DBA job role, other database builders usually have no idea how to take advantage of their chosen product to create an optimal definition for the schema. Without a proper definition, a database may suffer from performance problems and overhead, which consumes additional processor, memory, and disk I/O resources. This could lead to service level agreements being missed due to unsatisfactory performance and outages.

The solution to fix relational database performance requires a great deal of effort on the part of a DBA to analyze the existing schema, get additional input from the database owner, and write the new Data Definition Language (DDL). Depending on the scope of the database, the time and money spent optimizing the database for acceptable performance may be significant.

In accordance with an illustrative embodiment, a mechanism is provided that automates the optimization of a database definition for existing databases. The mechanism of the illustrative embodiment saves time and resources and increases a DBA's productivity. The illustrative embodiment also broadens the spectrum of Information Technology (IT) professionals, who can now maintain and optimize existing database definitions.

As new database software versions or fixpacks are released, a DBA must continually keep abreast of this information and hopefully make the correct decisions about database definitions. Depending on their level of expertise, such attempts could become a continuous loop of trial and error until the DDL is perfect.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Figure 1:
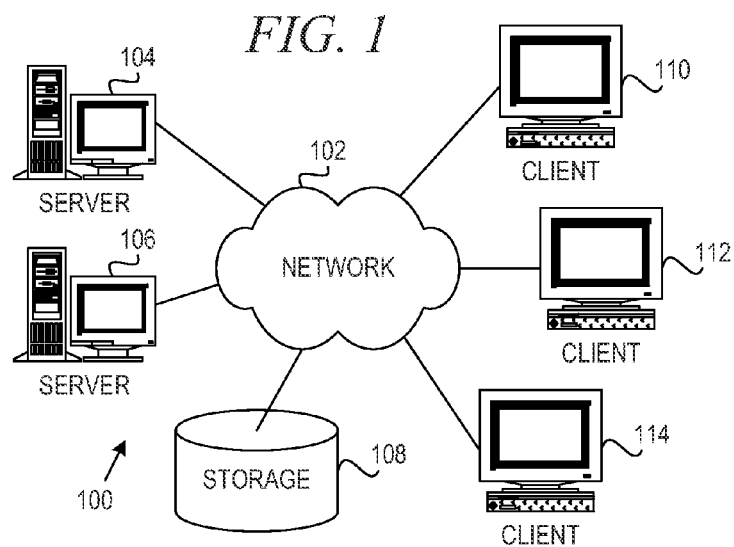
FIG. 1 is an example diagram of a distributed data processing system in which aspects of the illustrative embodiments may be implemented.
Figure 2:
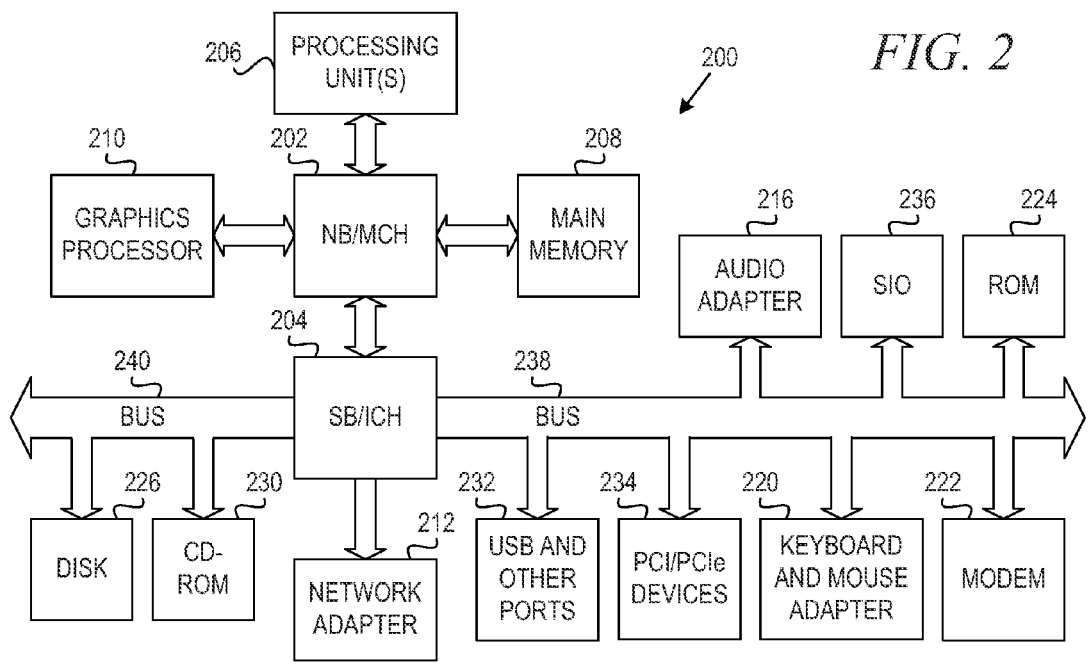
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In accordance with an illustrative embodiment, a mechanism is used to optimize existing tablespace, table, and index definitions using optimal configuration and column ordering, enabling the most efficient database utilization and performance possible. Typically, a database definition created by a Database Administrator (DBA) requires a significant amount of experience and data knowledge in order to create the optimal database. The process requires understanding of an underlying relational and storage engine of the product to get the most efficient definition. Non-DBAs may have no knowledge of this underlying factor and may create databases that consume more resources and are less likely to be as efficient as the databases a DBA would define. In the fast paced development cycle of today, DBA resources are not as available as they once were to developers. The mechanism of the illustrative embodiment reduces perfunctory DBA tasks, thus saving time and resources and increasing productivity. The mechanism does not require the DBA to concentrate on the definition details.

Figure 3:
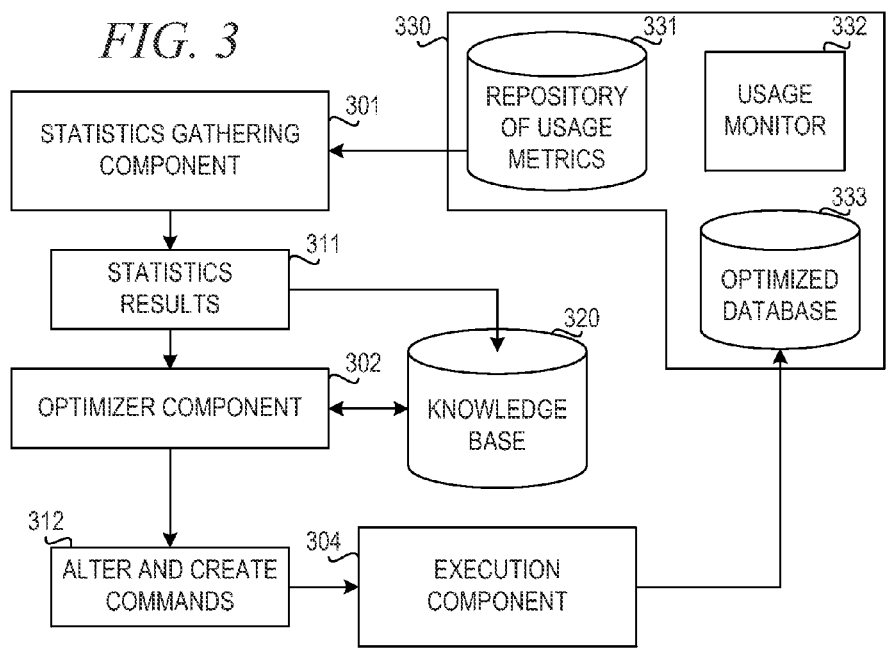
FIG. 3 is a block diagram illustrating a system for optimizing relational database definitions in an existing database in accordance with an illustrative embodiment.

FIG. 3 is a block diagram illustrating a system for optimizing database definitions in an existing database in accordance with an illustrative embodiment. Statistics gathering component 301 derives the necessary table and column behavior from an existing database 330 based on actual usage. Database 330 includes repository of usage metrics 331 collected by usage monitor 332. Statistics gathering component 301 analyzes data from repository 331 and generates statistics results 311 to knowledge base 320 and/or optimizer component 302.

Thus, knowledgebase 320 stores attributes of each type of object that is being optimized. For example, when optimizing a table, knowledgebase 320 allows a user to query the properties of each column in the table, such as the order that the column appears in the given table, whether or not the column is nullable, the type of the column, the size of each type of column, and the actual size of each column in the table.

Knowledgebase 320 requires access to information about the actual usage of a table. As an example, for each column, knowledgebase 320 captures the following measurements:

the average number of updates made within a specific time unit;
the specific number of updates made within a specific time unit;
the minimum number of updates made within a specific time unit;
the maximum number of updates made within a specific time unit;
the average number of reads made within a specific time unit;
the specific number of reads made within a specific time unit;
the minimum number of reads made within a specific time unit;
the maximum number of reads made within a specific time unit;
the average number of inserts made within a specific time unit;
the specific number of inserts made within a specific time unit;
the minimum number of inserts made within a specific time unit;
the maximum number of inserts made within a specific time unit;
the average column size and the related size unit;
the range or list of values for a given column; and,
the frequency percentage of how often a column is used in where clauses for statements against a given table.

The data insertion pattern for each column can be observed as random, ascending, or descending. This can be used for any type of field, but is best applied to a column type of DATE or TIMESTAMP.

At the table level, for the purposes of optimization, statistics gathering component 301 stores in knowledgebase 320 the number of rows that are added to a table during a specific time unit and the number of rows that are deleted from a table during a specific time unit.

Knowledgebase 320 also contains logic that accepts the above and other parameters as input and processes the parameters to determine what statements can be executed to optimize the target object. In one example embodiment, the optimization logic in knowledgebase 320 is in the form of decision trees, although other logic structures, such as rules, state machines, etc., may be used within the scope and spirit of the illustrative embodiments.

A decision tree is a flowchart-like structure in which internal node represents test on an attribute, each branch represents outcome of test and each leaf node represents class label (decision taken after computing all attributes). A path from root to leaf represents a classification rule. In decision analysis, a decision tree and the closely related influence diagram is used as a visual and analytical decision support tool, where the expected values (or expected utility) of competing alternatives are calculated. A decision tree consists of three types of nodes: 1. decision nodes—commonly represented by squares; 2. chance nodes—represented by circles; and, 3. end nodes—represented by triangles. Decision trees are commonly used in operations research, specifically in decision analysis, to help identify a strategy most likely to reach a goal.

Knowledgebase 320 can be extended for each database software release to embody the necessary extensions to reflect improvements in the database engine that may be derived via the mechanism of the illustrative embodiment. That is, as the database software is updated, as more knowledge about how the database software operates, as more effective optimizations are discovered, and as the database schema evolves over time, a DBA updates knowledgebase 320 to expand and improve the quantifiable information about database objects and the optimization logic to generate more improved optimizations.

Optimizer component 302 executes the logic from knowledgebase 320 against statistics results and other parameters, resulting in commands 312 for optimizing the database. In the depicted example, the database is a relational database, and commands 312 comprise ALTER and CREATE commands that reorder columns in a table, put tables in different table spaces, add indexes to a database, or make columns nullable or not nullable. Of course, commands 312 would be different for each type of database product.

In one example embodiment, different inputs are added that would result in different types of resulting actions, as long as they do not result in changing the way an existing application uses the database. For example, tables and columns will not be renamed and tables will not be moved to different schemas.

For details on the syntax of a command 312 as output of optimizer 302 for an existing database, consider the following example command structure:

OPTIMIZE OBJECT_TYPE OBJECT_NAME METHOD_TYPE;

This command breaks down as follows:

OPTIMIZE is the command that calls the process to optimize the database.

OBJECT_TYPE is the type of object to be considered for optimization, such as DATABASE, SCHEMA, or TABLE. These examples are specific object types found in widely used databases and may or may not be found in other types of databases. These examples are not meant to limit the types of objects that can be considered for optimization and are provided to illustrate the functionality of the illustrative embodiment.

OBJECT_NAME is the specific name of the object to be optimized.

METHOD_TYPE denotes whether or not the optimization is executed automatically or manually. A METHOD_TYPE of AUTO indicates the optimization is to be executed automatically, and a METHOD_TYPE of MANUAL indicates that the optimization is to be executed after the user has had a chance to review the suggested changes.

Specific examples of optimization commands are as follows:

OPTIMIZE DATABASE MY_DB AUTO;
OPTIMIZE SCHEMA MY_SCHEMA MANUAL;
OPTIMIZE TABLE MY_TABLE AUTO.

Thus, in response to a user submitting an optimization command, optimizer component 302 applies optimization logic in knowledgebase 320 to data about the structure of database 330 and gathered statistics 311 to generate commands 312. In one example embodiment, optimizer component 302 outputs commands 312 as one or more Data Description Language (DDL) files. Execution component 304 executes commands 312 against the existing database 330 to form optimized database 313. Possible alterations to an existing database schema may result in reordering table columns, adding indexes, and resizing the database table space. As stated above, executing commands 312 does not alter the database schema such that any application that uses database 330 would require alteration to use optimized database 313.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 4 is a flowchart illustrating the operation of a mechanism for optimizing database definitions in an existing database in accordance with an illustrative embodiment. Operation begins with a command to execute database optimization (block 400), and the mechanism receives a request to optimize the database (block 401). The mechanism queries a repository of usage metrics (block 402) and receives usage parameter values from the repository (block 403). The mechanism then analyzes extension elements to return (block 404). That is, the mechanism analyzes extension elements for an OBJECT_TYPE specified in the request received in block 401. Thus, OBJECT_TYPE is the type of object to be considered for optimization, such as DATABASE, SCHEMA, or TABLE. These examples are specific object types found in widely used databases and may or may not be found in other types of databases. These examples are not meant to limit the types of objects that can be considered for optimization and are provided to illustrate the functionality of the illustrative embodiment.

The mechanism queries the knowledgebase with the extension elements and collected parameter values (block 405). Based on results returned from the knowledgebase and on execution of logic within the knowledgebase, the mechanism generates optimization commands (block 406). That is, the mechanism identifies the relevant logic elements based on the collected parameter values and knowledge about the database schema and executes the relevant logic elements to identify database commands that will improve performance or resource usage. In one example embodiment, the mechanism identifies decision trees that receive as inputs the collected parameter values and knowledge about the database schema and follows the decision trees to end nodes that identify optimization commands. In one embodiment, the optimization commands are CREATE and ALTER commands that will optimize the database schema. These optimization commands not only improve performance and resource usage, but also preferably result in modifying the database schema with minimum downtime. In one example embodiment, the optimization commands are in the form of a DDL file.

The particular decision trees and resulting statements depend greatly on the database product being used and the current situation. The optimization logic in the knowledgebase must consider a large number of usage measurements and database schema scenarios. A DBA may also update the knowledgebase, including the optimization logic, as new optimization techniques are discovered.

The mechanism then determines whether the request for database optimization requests automatic or manual optimization (block 407). The requesting user may specify whether the optimization is to run automatically or manually in the initial optimization command. Alternatively, the mechanism may prompt the user to specify whether the optimization is to run automatically. If the optimization is to run automatically, the mechanism executes the optimization commands against the database (block 408). Thereafter, operation ends (block 409).

If the optimization is to run manually in block 407, the mechanism returns the optimization commands to the requesting user (block 410). The user may then review the optimization commands to confirm the commands, save the optimization commands for later execution, or schedule the optimization commands to minimize downtime. At this point, the user may alter the commands depending on the specific implementation. Thereafter, operation ends (block 409).

Figure 5:
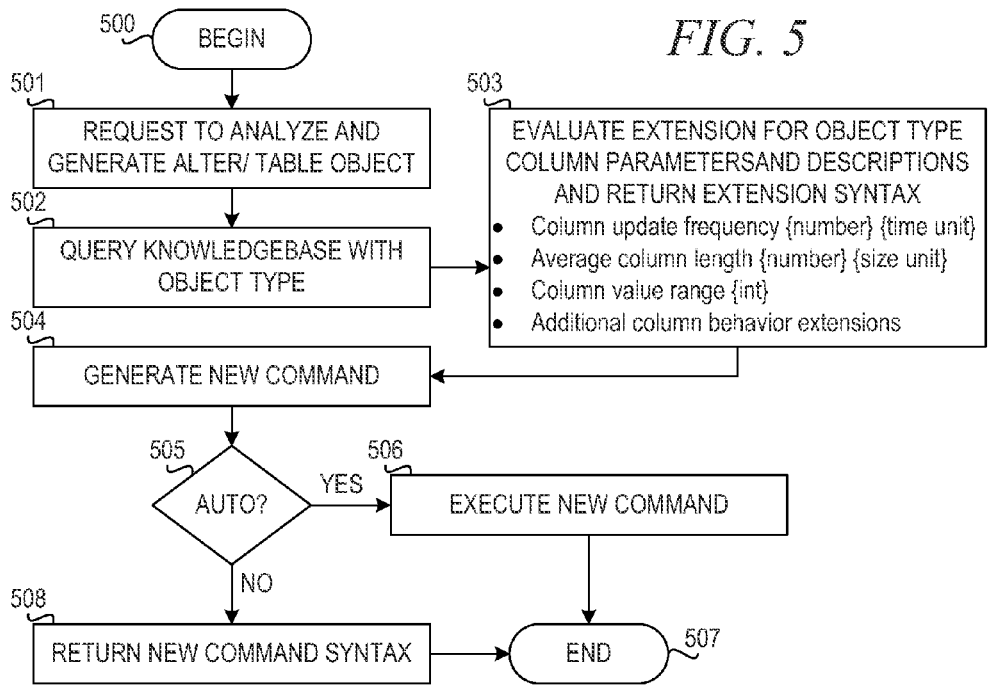
FIG. 5 is a flowchart illustrating an example operation of a mechanism for optimizing a table of a database in an existing database in accordance with an illustrative embodiment.

FIG. 5 is a flowchart illustrating an example operation of a mechanism for optimizing a table of a database in an existing database in accordance with an illustrative embodiment. Operation begins for optimizing a column of a database (block 500), and the mechanism receives a request to analyze and generate an ALTER command for a table object (block 501). The mechanism queries the knowledgebase with the object type of COLUMN (block 502). The mechanism evaluates extension for object type COLUMN parameters and descriptions and returns the extension syntax (block 503). In the depicted example, the extension syntax comprises the following:

column update frequency {number} {time unit};
average column length {number}(size unit);
column value range {int}; and,
additional column behavior extensions.

Next, the mechanism generates at least one new command to optimize a table of the database (bock 504). The mechanism then determines whether the request for database optimization requests automatic or manual optimization (block 505). If the optimization is to run automatically, the mechanism executes the optimization commands against the database (block 506). Thereafter, operation ends (block 507).

If the optimization is to run manually in block 505, the mechanism returns the optimization commands to the requesting user (block 508). The user may then review the optimization commands to confirm the commands, save the optimization commands to execute later, or schedule the optimization commands to minimize downtime. At this point, the user may alter the commands depending on the specific implementation. Thereafter, operation ends (block 507).

Thus, the illustrative embodiments provide mechanisms for optimizing database definitions in an existing database. The mechanism uses information gathered from a usage monitor and metadata about the database stored in a knowledgebase to generate commands to optimize the database definitions. The mechanism involves running optimization logic from the knowledgebase that derives the necessary table and column behavior from an existing database based on actual usage. The mechanism returns a Data Description Language (DDL) file containing commands to optimize the database. The mechanism executes the commands in the DDL file automatically or returns the DDL file to the user to be executed manually.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing a database definition of an existing database, the method comprising:

receiving an optimization command that requests optimization of one or more database objects in the existing database, wherein the optimization command identifies an object type to be optimized and an object name of one or more database objects in the existing database to be optimized;

querying a repository of usage metrics based on the object type to be optimized;

receiving usage parameter values for the existing database from the repository of usage metrics;

querying a knowledgebase based on the usage parameter values and the object type to be optimized to identify a decision tree within optimization logic of the knowledgebase that accepts the usage parameter values as input and processes the usage parameter values to determine database commands that can be executed to optimize the one or more database objects, wherein the optimization logic comprises a plurality of decision trees having decision nodes, chance nodes, and end nodes, wherein each end node identifies a command to optimize a given database object;

executing the identified decision tree to generate a set of database commands based on the usage parameter values, wherein the set of database commands, when executed against a database definition of the existing database, optimize the one or more database objects of the existing database; and returning the set of optimization commands.

2. The method of claim 1, wherein generating the set of database commands comprises generating a data description language file comprising the set of database commands.

3. The method of claim 1, wherein the set of database commands comprise ALTER and CREATE commands that reorder columns in a table, put tables in different table spaces, add indexes to a database, make columns nullable, or make columns not nullable.

4. The method of claim 1, wherein the repository of usage metrics is stored by a usage monitor in a database.

5. The method of claim 4, wherein the repository of usage metrics stores at least one of:

an average number of updates made within a specific time unit;

a specific number of updates made within a specific time unit;

a minimum number of updates made within a specific time unit;

a maximum number of updates made within a specific time unit;

an average number of reads made within a specific time unit;

a specific number of reads made within a specific time unit;

a minimum number of reads made within a specific time unit;

a maximum number of reads made within a specific time unit;

an average number of inserts made within a specific time unit;

a specific number of inserts made within a specific time unit;

a minimum number of inserts made within a specific time unit;

a maximum number of inserts made within a specific time unit;

an average column size and the related size unit;

a range or list of values for a given column;

a frequency percentage of how often a column is used in where clauses for statements against a given table; or a data insertion pattern for each column observed as random, ascending, or descending.

6. The method of claim 3, wherein the set of database commands do not rename tables columns and do not move tables to different schemas.

7. The method of claim 1, wherein the optimization command identifies a method type that identifies whether the optimization is to be executed automatically or manually.

8. The method of claim 7, further comprising automatically executing the set of database commands against the database definition of the existing database responsive to the method type identifying that optimization is to be executed automatically.

9. A computer program product comprising a non-transitory computer readable storage medium having a computer readable program stored therein, wherein the computer readable program, when executed on a computing device, causes the computing device to:

receive an optimization command that requests optimization of one or more database objects in the existing database, wherein the optimization command identifies an object type to be optimized and an object name of one or more database objects in the existing database to be optimized;

query a repository of usage metrics based on the object type to be optimized;

receive usage parameter values for an existing database from the repository of usage metrics;

query a knowledgebase based on the usage parameter values and the object type to be optimized to identify a decision tree within optimization logic of the knowledgebase that accepts the usage parameter values as input and processes the usage parameter values to determine database commands that can be executed to optimize the one or more database objects, wherein the optimization logic comprises a plurality of decision trees having decision nodes, chance nodes, and end nodes, wherein each end node identifies a command to optimize a given database object;

execute the identified decision tree to generate a set of database commands based on the usage parameter values, wherein the set of database commands, when executed against a database definition of the existing database, optimize the one or more database objects of the existing database; and return the set of optimization commands.

10. The computer program product of claim 9, wherein generating the set of database commands comprises generating a data description language file comprising the set of database commands.

11. The computer program product of claim 9, wherein the set of database commands comprise ALTER and CREATE commands that reorder columns in a table, put tables in different table spaces, add indexes to a database, make columns nullable, or make columns not nullable.

12. The computer program product of claim 9, wherein the repository of usage metrics is stored by a usage monitor in a database.

13. The computer program product of claim 9, wherein the set of database commands do not rename tables or columns and do not move tables to different schemas.

14. The computer program product of claim 9, wherein the optimization command comprises a method type that identifies whether the optimization is to be executed automatically or manually and wherein the computer readable program further causes the computing device to:
   automatically execute the set of database commands against the database definition of the existing database responsive to the method type identifying that optimization is to be executed automatically.

15. An apparatus comprising:
   a processor; and
   a memory coupled to the processor, wherein the memory comprises instructions which, when executed by the processor, cause the processor to:
   receive an optimization command that requests optimization of one or more database objects in the existing database, wherein the optimization command identifies an object type to be optimized and an object name of one or more database objects in the existing database to be optimized;
   query a repository of usage metrics based on the object type to be optimized;
   receive usage parameter values for an existing database from the repository of usage metrics;
   query a knowledgebase based on the usage parameter values and the object type to be optimized to identify a decision tree within optimization logic of the knowledgebase that accepts the usage parameter values as input and processes the usage parameter values to determine database commands that can be executed to optimize the one or more database objects, wherein the optimization logic comprises a plurality of decision trees having decision nodes, chance nodes, and end nodes, wherein each end node identifies a command to optimize a given database object;
   execute the identified decision tree to generate a set of database commands based on the usage parameter values, wherein the set of database commands, when executed against a database definition of the existing database, optimize the one or more database objects of the existing database; and
   return the set of optimization commands.

16. The apparatus of claim 15, wherein generating the set of database commands comprises generating a data description language file comprising the set of database commands.

17. The apparatus of claim 15, wherein the repository of usage metrics is stored by a usage monitor in a database.

18. The apparatus of claim 15, wherein the set of database commands do not rename tables or columns and do not move tables to different schemas.

19. The apparatus of claim 15, wherein the optimization command comprises a method type that identifies whether the optimization is to be executed automatically or manually and where the instructions further cause the processor to:
   automatically execute the set of database commands against the database definition of the existing database responsive to the method type identifying that optimization is to be executed automatically.

* * * * *